US011945104B2

(12) United States Patent
Gumann et al.

(10) Patent No.: US 11,945,104 B2
(45) Date of Patent: Apr. 2, 2024

(54) JIB CRANE MECHANISM (71) Applicant: International Business Machines Corporation, Armonk, NY (US)

(72) Inventors: Patryk Gumann, Tarrytown, NY (US); Sean Hart, Tarrytown, NY (US); Valerio A. Grendanin, St. Augustine, FL (US); Raymond A. Watters, Ulster, NY (US); David Zarsky, Bethlehem, PA (US); Gilbert Bauer, Peekskill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 675 days.

(21) Appl. No.: 17/144,767

(22) Filed: Jan. 8, 2021

(65) Prior Publication Data

US 2022/0219950 A1  Jul. 14, 2022

(51) Int. Cl.
*B25J 18/00* (2006.01)
*F16M 11/10* (2006.01)

(52) U.S. Cl.
CPC ............ *B25J 18/007* (2013.01); *F16M 11/10* (2013.01)

(58) Field of Classification Search
CPC .......... B25J 18/007; F16M 11/10; B66C 1/68; B66C 1/22; B66C 1/28; B66C 1/30; B66C 1/625; B66C 23/04; B66C 23/16; B66C 23/163; B66C 23/18; B66C 23/66; B66C 23/68; B66C 23/70; B66C 23/585
See application file for complete search history.

(56) References Cited

U.S. PATENT DOCUMENTS

| | | | | |
|---|---|---|---|---|
| 2,272,958 A | * | 2/1942 | Wiese | B66C 23/50 |
| | | | | 212/253 |
| 2,956,691 A | | 10/1960 | Fangman | |
| 3,019,918 A | | 2/1962 | Keener | |
| 3,272,347 A | | 9/1966 | Lemelson | |
| 3,855,954 A | * | 12/1974 | Quick | B66C 23/72 |
| | | | | 212/289 |
| 3,945,866 A | * | 3/1976 | Rudder | B29D 30/20 |
| | | | | 156/126 |

(Continued)

FOREIGN PATENT DOCUMENTS

| | | |
|---|---|---|
| CN | 203669790 U | 6/2014 |
| CN | 109279513 A | 1/2019 |
| WO | 2015/021558 A1 | 2/2015 |

OTHER PUBLICATIONS

International Search Report and Written Opinion received for PCT Application Serial No. PCT/EP2021/087871 dated Apr. 13, 2022, 13 pages.

*Primary Examiner* — Emmanuel M Marcelo
(74) *Attorney, Agent, or Firm* — Amin, Turocy & Watson, LLP (57) ABSTRACT

Techniques facilitating increased operational reliability for jib cranes are provided. In one example, a jib crane can comprise a mast, a shaft mechanism, and a rod. The mast can extend vertically from a base structure. The shaft mechanism can be disposed within the mast. The rod can be coupled to a boom arm and can be disposed within the shaft mechanism. Rotation of the rod can facilitate continuous rotation of the boom arm about a longitudinal axis of the rod with respect to the base structure.

25 Claims, 9 Drawing Sheets

(56) References Cited

U.S. PATENT DOCUMENTS

| | | | |
|---|---|---|---|
| 4,091,943 A | | 5/1978 | Bay-Schmith |
| 4,556,358 A | * | 12/1985 | Harlan .................... B66C 23/36 |
| | | | 212/238 |
| 5,106,255 A | | 4/1992 | Motoda et al. |
| 5,431,526 A | * | 7/1995 | Peterson ................ B66C 23/44 |
| | | | 212/231 |
| 5,487,478 A | | 1/1996 | Morrow |
| 6,082,561 A | * | 7/2000 | Bembas ................ B60P 1/5452 |
| | | | 212/253 |
| 6,152,675 A | * | 11/2000 | Compton ............. B60P 1/5495 |
| | | | 224/403 |
| 6,830,423 B1 | * | 12/2004 | Williams ............. A61G 3/0209 |
| | | | 212/180 |
| 6,981,834 B1 | | 1/2006 | Henry |
| 8,857,567 B1 | * | 10/2014 | Raymond ............. B66C 23/702 |
| | | | 182/2.1 |
| 9,623,270 B2 | * | 4/2017 | Palet .................. A62B 35/0068 |
| 9,630,816 B1 | * | 4/2017 | Napieralski ............ B66C 19/02 |
| 10,415,199 B2 | * | 9/2019 | Smothers .............. F04D 29/605 |
| 2012/0241404 A1 | * | 9/2012 | Bobeck .................. B66C 23/52 |
| | | | 212/300 |
| 2018/0346293 A1 | * | 12/2018 | Carmel ..................... B66C 1/26 |
| 2020/0325006 A1 | * | 10/2020 | Kundel, Sr. ............. B66C 23/16 |
| 2020/0363014 A1 | | 11/2020 | Hart et al. |

* cited by examiner

JIB CRANE MECHANISM

BACKGROUND

The subject disclosure relates to mechanical mechanisms for transferring loads, and more specifically, to techniques that facilitate increased operational reliability for jib cranes.

Jib cranes are versatile lifting devices that can facilitate transferring loads about arcs circumscribing their respective base structure. Some jib cranes employ bearings that facilitate jib crane rotation while transferring loads by minimizing friction between moving parts. As mechanical components, bearings are subject to increasing failure rates or wear-out failures over time as a result of component deterioration due to age or use. To the extent that jib cranes transfer loads by rotation, bearing failure can negatively impact jib crane operational reliability and lead to increased equipment downtime.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, and/or methods that facilitate increased operational reliability for jib cranes are described.

According to an embodiment, a jib crane can comprise a mast, a shaft mechanism, and a rod including a longitudinal axis. The mast can extend vertically from a base structure. The shaft mechanism can be disposed within the mast. The rod can be coupled to a boom arm and can be disposed within the shaft mechanism. Rotation of the rod can facilitate continuous rotation of the boom arm about the longitudinal axis with respect to the base structure. One aspect of such a jib crane is that the jib crane can facilitate increasing operational reliability.

In an embodiment, the jib crane can further comprise an adjustment mechanism intervening between the boom arm and the rod that facilitates adjusting an angular orientation of the boom arm relative to the mast. One aspect of such a jib crane is that the jib crane can provide additional flexibility for aligning a correspondence between a load and the boom arm to facilitate transferring the load.

According to another embodiment, an apparatus can comprise a boom arm coupled to a rod disposed within a shaft mechanism that is disposed within a mast extending vertically from a base structure. Rotation of the rod facilitates continuous rotation of the boom arm about a longitudinal axis of the rod with respect to the base structure. One aspect of such an apparatus is that the apparatus can facilitate increasing operational reliability.

In an embodiment, the boom arm can comprise a proximal end coupled to the rod. In an embodiment, the apparatus can further comprise an adjustment mechanism intervening between the boom arm and a mounting bracket coupled to a distal end of the boom arm that opposes the proximal end. The adjustment mechanism can facilitate adjusting an angular orientation of the mounting bracket within a transverse plane that is orthogonal to a centerline of the boom arm. One aspect of such an apparatus is that the apparatus can provide additional flexibility for aligning a correspondence between a load and the boom arm to facilitate transferring the load.

According to another embodiment, an apparatus can comprise a shaft mechanism and a rod. The shaft mechanism can be disposed within a mast extending vertically from a base structure. The shaft mechanism can support a boom arm. The rod can be disposed within the shaft mechanism. Rotation of the rod can facilitate continuous rotation of the boom arm about a longitudinal axis of the rod with respect to the base structure. One aspect of such an apparatus is that the apparatus can facilitate increasing operational reliability.

In an embodiment, the shaft mechanism can be adjustable along the longitudinal axis to facilitate adjusting a distance between the base structure and a proximal end of the boom arm that is coupled to the shaft mechanism. One aspect of such an apparatus is that the apparatus can provide additional flexibility for aligning a correspondence between a load and the boom arm to facilitate transferring the load.

According to another embodiment, an apparatus can comprise a rod including a longitudinal axis, a boom arm, and a mounting bracket. The rod can be disposed within a mast extending from a base structure. The boom arm can be coupled to the rod via a proximal end of the boom arm. The boom arm can be continuously rotatable about the longitudinal axis with respect to the base structure. The mounting bracket can facilitate coupling a load to a distal end of the boom arm that opposes the proximal end of the boom arm coupled to the rod. One aspect of such an apparatus is that the apparatus can facilitate increasing operational reliability.

In an embodiment, the apparatus can further comprise one or more adjustment mechanisms that facilitate adjusting: an angular orientation of the boom arm relative to the mast; an angular orientation of the mounting bracket within a transverse plane that is orthogonal to a centerline of the boom arm; a distance between the mounting bracket and the mast; an angular orientation of the mounting bracket with respect to the boom arm; or a combination thereof. One aspect of such an apparatus is that the apparatus can provide additional flexibility for aligning a correspondence between a load and the boom arm to facilitate transferring the load.

According to another embodiment, a computer-implemented method can comprise coupling, by a system operatively coupled to a processor, a load to a distal end of a boom arm comprising a proximal end coupled to a rod disposed within a shaft mechanism disposed within a mast extending vertically from a base structure. The boom arm can be continuously rotatable about a longitudinal axis of the rod with respect to the base structure. The computer-implemented method can further comprise transferring, by the system, the load from a first position to a second position by rotating the boom arm about the longitudinal axis. One aspect of such a computer-implemented method is that the method can facilitate increasing operational reliability.

In an embodiment, the computer-implemented method can further comprise adjusting, by the system, an angular orientation of the boom arm relative to the mast, an angular orientation of a mounting bracket within a transverse plane that is orthogonal to a centerline of the boom arm, a distance between the mounting bracket and the mast, or an angular orientation of the mounting bracket with respect to the boom arm, wherein the mounting bracket is coupled to the distal end of the boom arm. One aspect of such a computer-implemented method is that the method can provide additional flexibility for aligning a correspondence between a load and the boom arm to facilitate transferring the load.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Embodiments described herein address the deficiencies discussed above to facilitate increased operational reliability for jib cranes. For example, as discussed above, some jib cranes employ bearings that facilitate jib crane rotation while transferring loads by minimizing friction between moving parts. However, as mechanical components, bearings are subject to increasing failure rates or wear-out failures over time as a result of component deterioration due to age or use. To the extent that jib cranes transfer loads by rotation, bearing failure can negatively impact jib crane operational reliability and lead to increased equipment downtime. In contrast, embodiments described herein can facilitate increased jib crane operational reliability by implementing bearing-less mast structures.

Figure 1:
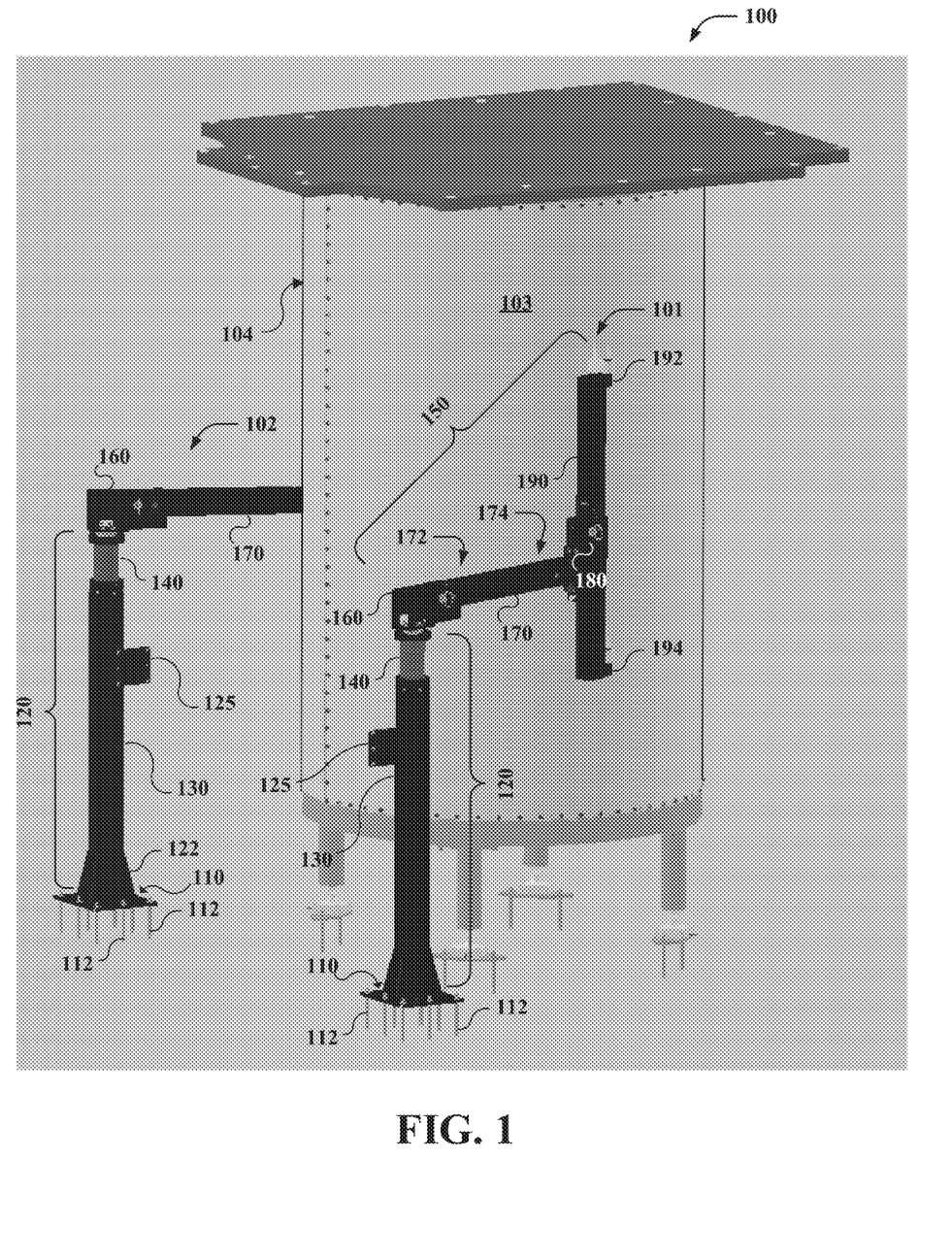
FIG. 1 illustrates a perspective view of an example, non-limiting operating environment for implementing one or more embodiments described herein.
Figure 2:
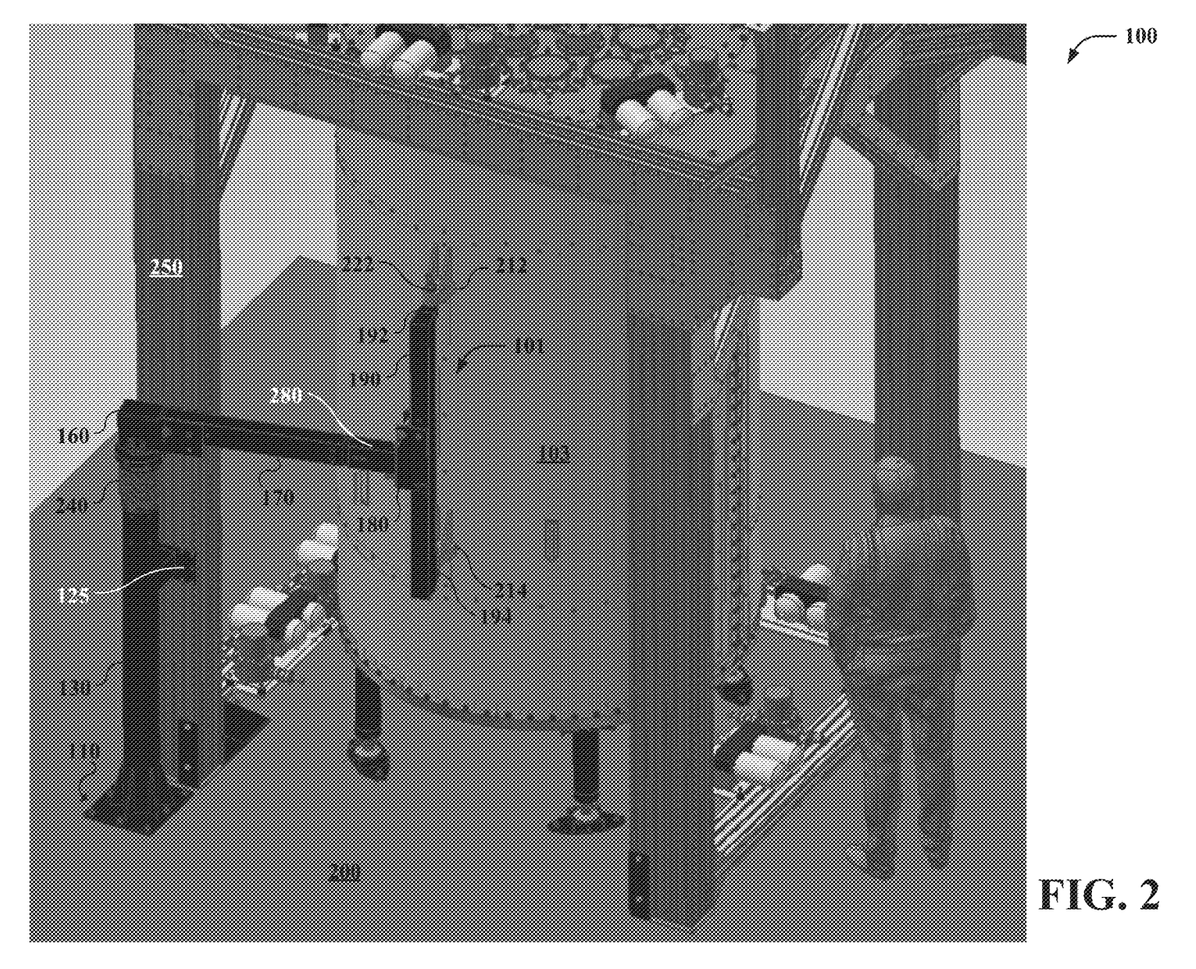
FIG. 2 illustrates another perspective view of the example, non-limiting operating environment of FIG. 1, in accordance with one or more embodiments described herein.
Figure 3:
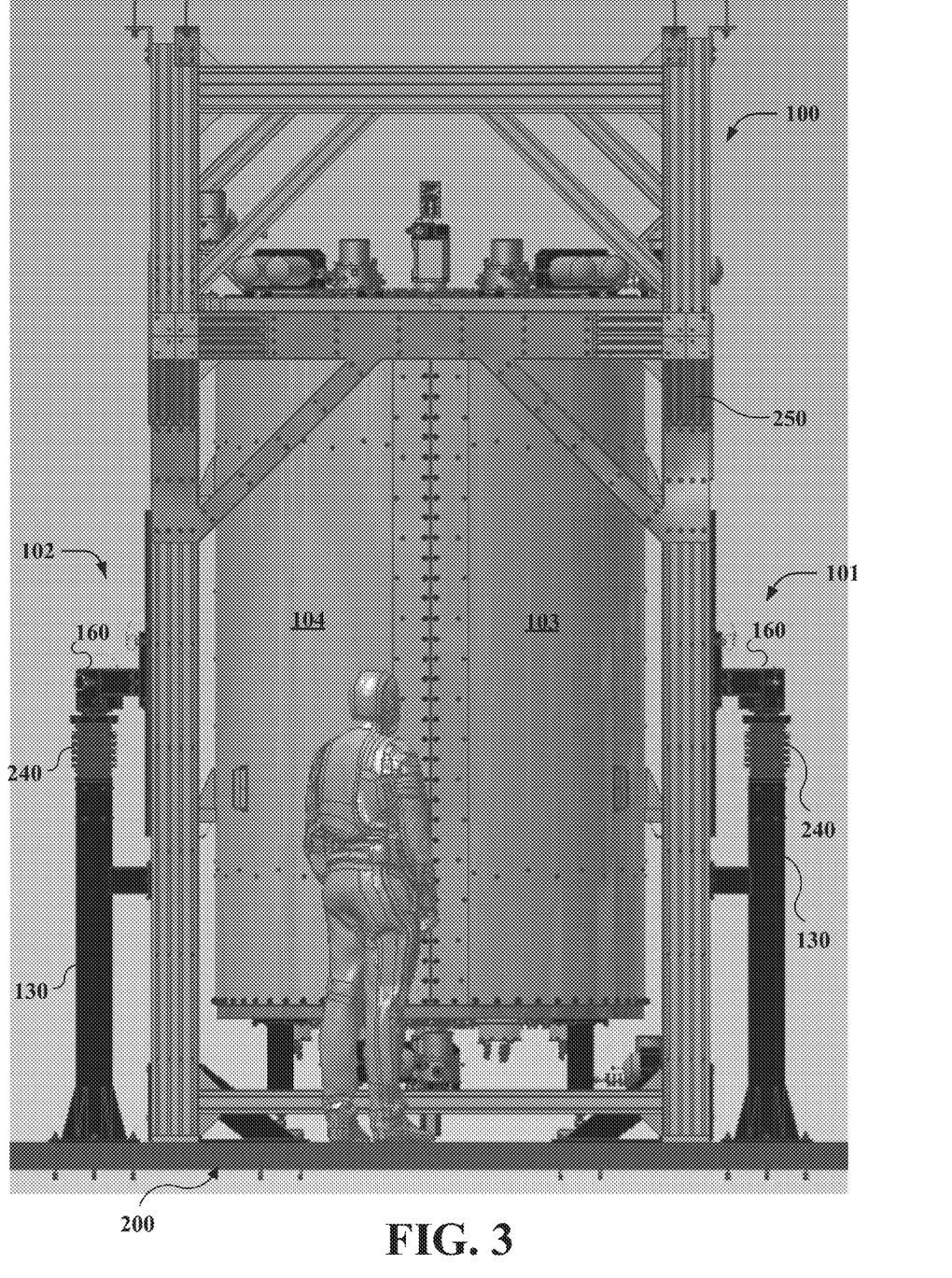
FIG. 3 illustrates a side view of the example, non-limiting operating environment of FIG. 1, in accordance with one or more embodiments described herein.

FIGS. 1-3 illustrate an example, non-limiting operating environment 100 for implementing one or more embodiments described herein. As illustrated, operating environment 100 includes jib cranes 101 and 102 that are coupled to loads 103 and 104, respectively. While FIGS. 1-3 depict loads 103 and 104 as sectioned sidewalls of a cylindrical chamber (e.g., an outer vacuum chamber of a cryostat), one skilled in the art will appreciate that jib cranes 101 and/or 102 can be coupled to other types of loads for transportation. Jib cranes 101 and 102 each generally comprise a base structure 110 coupled to a mast structure 120 that mechanically supports an arm structure 150. Base structure 110 can be anchored to a surface 200 via a plurality of attachment mechanisms 112. In an embodiment, a load capacity of the jib crane defines a number of attachment mechanisms comprising the plurality of attachment mechanisms 112, a length at least one attachment mechanism comprising the plurality of attachment mechanisms 112, or a combination thereof.

Surface 200 can be a substantially fixed foundation structure (e.g., a concrete slab, a metallic platform, and the like) that mechanically supports loads 103 and 104, as shown by FIGS. 2-3. In an embodiment, surface 200 can be a mobile platform that facilitates relocating jib cranes 101 and/or 102 from one position to another for coupling to different loads. For example, surface 200 can comprise a cart, a moveable platform, a vehicle, and the like. In an embodiment, one or more gusset plates 122 can be attached (e.g., welded) to jib cranes 101 and/or 102 proximate to an intersection between base structure 110 and mast structure 120. The one or more gusset plates 122 can provide additional mechanical support for mast structure 120. The one or more gusset plates 122 can further strengthen an attachment mechanism (e.g., a weld) that couples base structure 110 with mast structure 120.

As shown by FIG. 2, mast structure 120 can also be coupled to a base structure 125 that is anchored to a frame 250 supporting loads 103 and 104. In an embodiment, jib cranes 101 and/or 102 can be implemented without base structure 110 or base structure 125. For example, jib crane 101 can be implemented with a mast structure 120 that extends vertically from base structure 125. In this example, jib crane 101 can be decoupled from the surface 200 supporting frame 250. As another example, jib crane 102 can be implemented without base structure 125 such that jib crane 102 is decoupled from frame 250.

Figure 4:
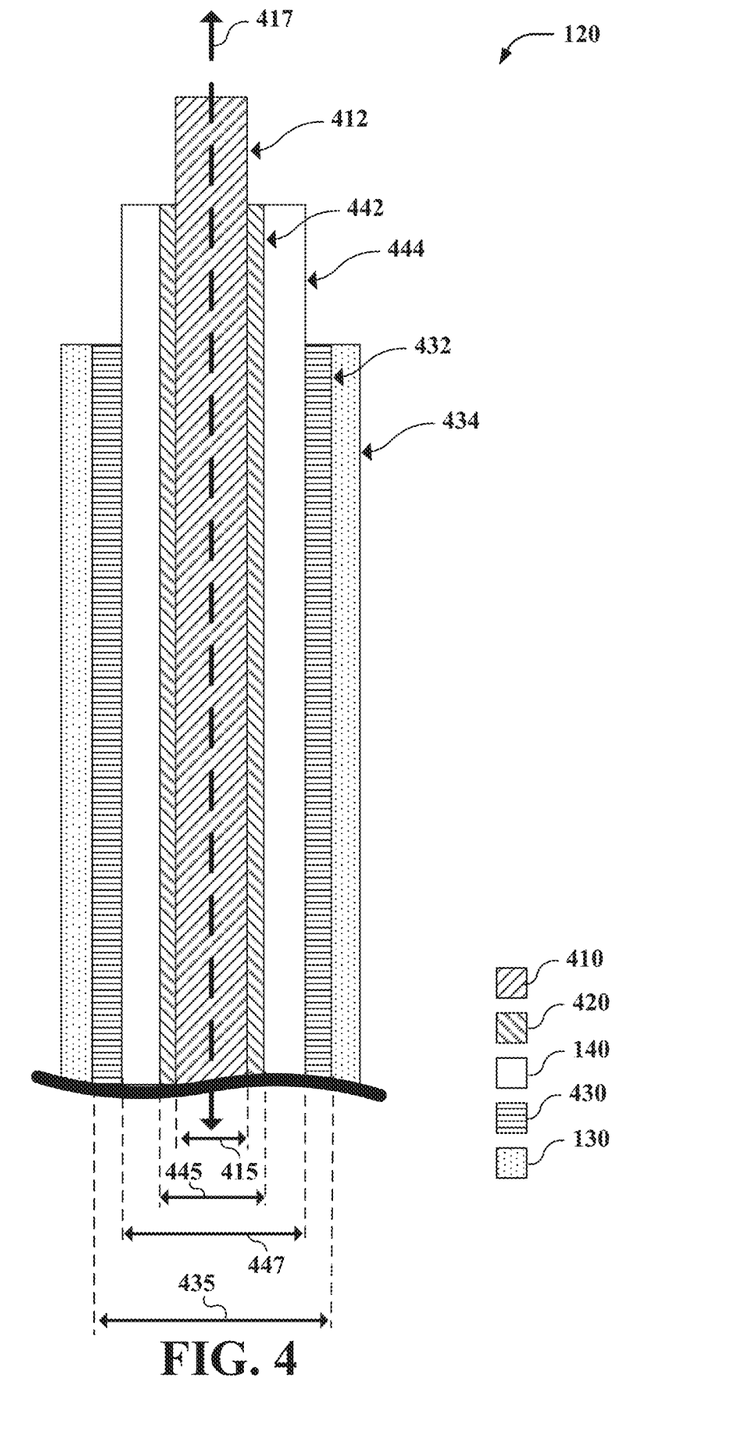
FIG. 4 illustrates a section view of an example, non-limiting mast structure, in accordance with one or more embodiments described herein.

Turning to FIG. 4, mast structure 120 comprises a mast 130, a shaft mechanism 140 disposed within mast 130, and a rod 410 disposed within shaft mechanism 140. Internal walls 442 of shaft mechanism 140 define a channel having a diameter 445 that can be dimensioned based on an outer diameter 415 of rod 410. One aspect of dimensioning diameter 445 can involve setting a minimum value for diameter 445 such that the channel defined by the internal walls 442 of shaft mechanism 140 can receive rod 410. Another aspect of dimensioning diameter 445 can involve setting a maximum value for diameter 445 to facilitate sufficient contact between the outer walls 412 of rod 410 and the inner walls 442 of shaft mechanism 140 such that, at least, a portion of torque applied to rod 410 can be transferred to shaft mechanism 140. In an embodiment, the maximum value for diameter 445 can be set to minimize an annulus 420 between rod 410 and shaft mechanism 140. In an embodiment, shaft mechanism 140 can comprise a cylinder of stainless steel. In an embodiment, rod 410 can be solid. In an embodiment, rod 410 can be hollow with a channel that substantially circumscribes a longitudinal axis 417 of rod 410.

Internal walls 432 of mast 130 define a channel having a diameter 435 that can be dimensioned based on an outer diameter 447 of shaft mechanism 140. One aspect of dimensioning diameter 435 can involve setting a minimum value for diameter 435 such that the channel defined by the internal walls 432 of mast 130 can shaft mechanism 140. Another aspect of dimensioning diameter 435 can involve setting a value for diameter 435 to establish an annulus 430 between mast 130 and shaft mechanism 140 that facilitates minimizing contact between the outer walls 444 of shaft mechanism 140 and the inner walls 432 of mast 130. Minimizing such contact can facilitate rotation of shaft mechanism 140 within mast 130 as torque is applied to rod 410.

In an embodiment, a bushing can intervene between shaft mechanism 140 and mast 130. In an embodiment, the bushing can intervene between shaft mechanism 140 and mast 130 within annulus 430. In an embodiment, the bushing can intervene between shaft mechanism 140 and mast 130 proximate to boom arm 170, proximate to base structure 110, or a combination thereof. In an embodiment, the bushing can contact the internal walls 432 of mast 130 and the outer walls of shaft mechanism 140. In an embodiment, a protective sleeve 240 can overlay shaft mechanism 140 to mitigate entry of debris within annulus 430, as shown by FIGS. 2-3.

With reference to FIGS. 1-3, arm structure 150 generally comprises a boom arm 170 and a mounting bracket 190. A proximal end 172 of boom arm 170 is coupled to the rod 410 disposed within mast structure 120 via an adjustment mechanism 160. By coupling rod 410 to the proximal end 172 of boom arm 170, rotation of rod 410 facilitates continuous rotation of boom arm 170 about the longitudinal axis 417 with respect to base structure 110. A distal end 174 of boom arm 170 is coupled to mounting bracket 190 via adjustment mechanisms 180 and 280, as best seen in FIG. 2.

Mounting bracket 190 can facilitate coupling a load (e.g., loads 103 and/or 104) to the distal end 174 of boom arm 170. To that end, mounting bracket 190 can comprise one or more pick points that facilitate coupling the load to the distal end 174 of boom arm 170. In example operating environment 100, the one or more pick points include pick points 192 and 194, as best seen in FIG. 2. Load 103 comprises brackets 212 and 214. Pick point 192 can receive a retention mechanism 222 that passes through bracket 212 and pick point 194 can receive a retention mechanism 214 that passes through bracket 214. In FIGS. 1-6, pick points 192 and 194 are depicted as being disposed proximate to opposing ends of mounting bracket 190. However, in other embodiments, the one or more pick points of mounting bracket 190 can be arranged differently. For example, mounting bracket 190 can comprise a pick point disposed proximate to a mid-point of mounting bracket 190.

Figure 5:
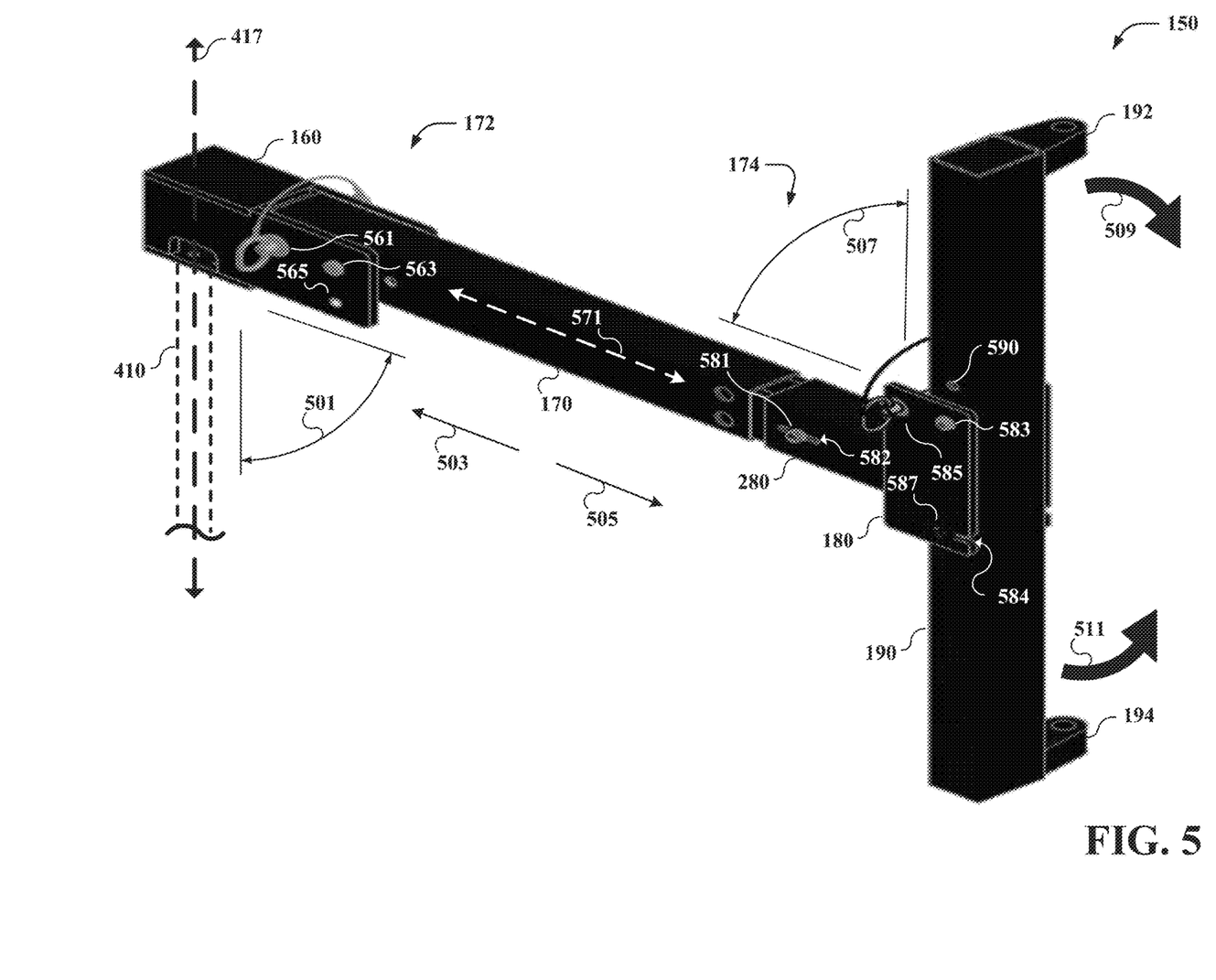
FIG. 5 illustrates a perspective view of an example, non-limiting arm structure, in accordance with one or more embodiments described herein.
Figure 6:
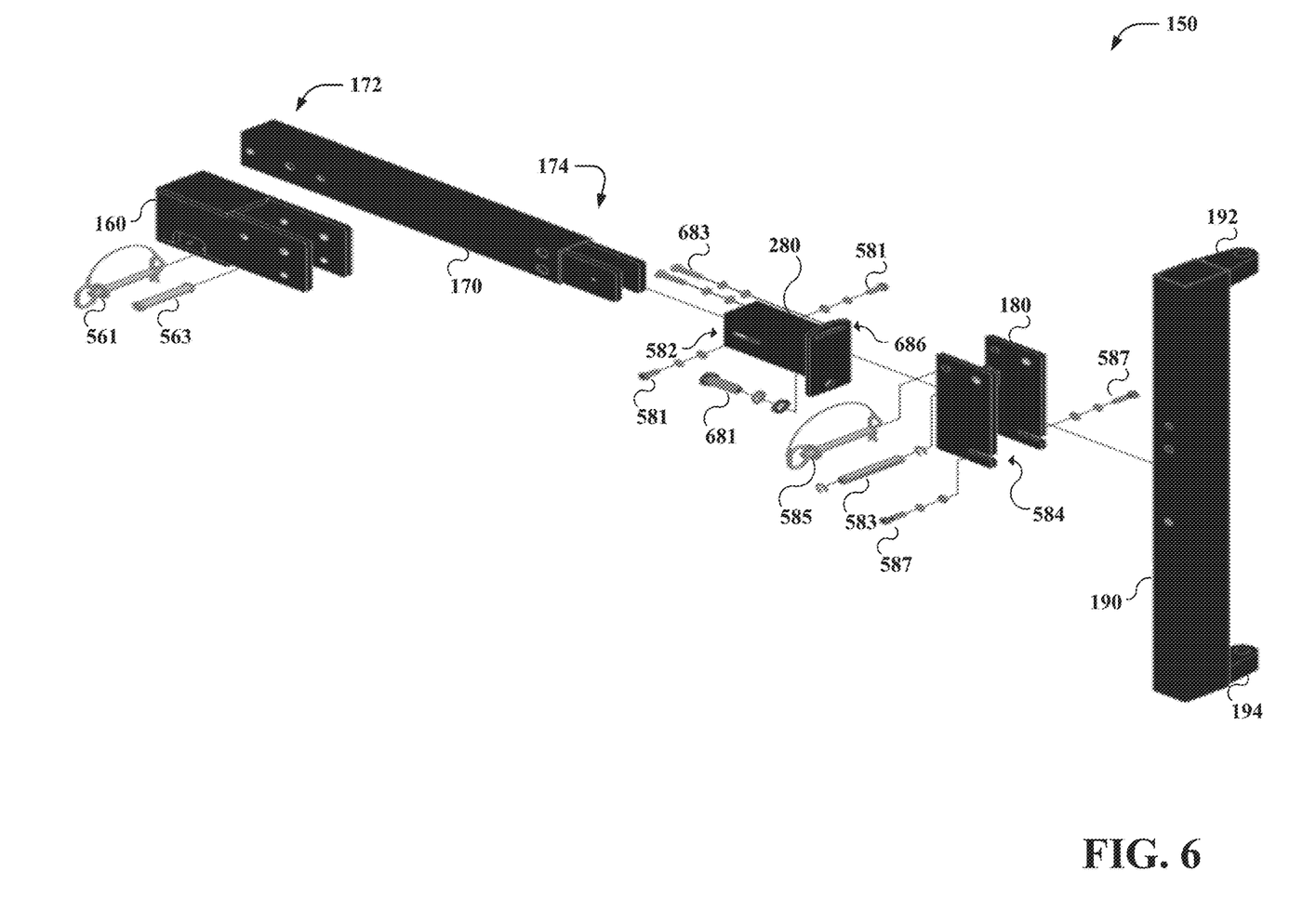
FIG. 6 illustrates an exploded perspective view of the example, non-limiting arm structure of FIG. 5, in accordance with one or more embodiments described herein.

In various embodiments described herein, arm structure 150 can further comprise one or more adjustment mechanisms that provide additional flexibility for aligning a correspondence between a load and boom arm 170 to facilitate transferring the load. With reference to FIGS. 5-6, arm structure 150 can comprise an adjustment mechanism 160 that intervenes between rod 410 and a proximal end 172 of boom arm 170. Adjustment mechanism 160 can facilitate detachably coupling boom arm 170 and rod 410 by operation of retention mechanism 561. Adjustment mechanism 160 can further facilitate adjusting an angular orientation 501 of boom arm 170 relative to mast 130 by operation of pin 563. For example, the angular orientation 501 of boom arm 170 relative to mast 130 by transitioning pin 563 from the upper clearance hole of adjustment mechanism 160 in which FIG. 5 depicts pin 563 to a lower clearance hole 565 of adjustment mechanism 160.

Arm structure 150 can further comprise an adjustment mechanism 280 that intervenes between mounting bracket 190 and a distal end 174 of boom arm 170. Adjustment mechanism 280 can facilitate adjusting a distance between mounting bracket 190 and mast 130 by operation of attachment mechanism 581 and slot 582. For example, movement of attachment mechanism 581 within slot 582 can be restricted when attachment mechanism 581 is in a tightened state whereas such movement of attachment mechanism 581 can be permitted when attachment mechanism 581 is in a non-tightened state. As such, attachment mechanism 581 can be transitioned into the non-tightened state to adjust a distance between mounting bracket 190 and mast 130 in an inward direction 503 or an outward direction 505. When the desired distance between mounting bracket 190 and mast 130 is obtained, attachment mechanism can be transitioned from the non-tightened state to the tightened state.

Adjustment mechanism 280 can further facilitate adjusting an angular orientation of mounting bracket 190 within a transverse plane that is orthogonal to a centerline 571 of boom arm 170 by operation of attachment mechanism 681, attachment mechanism 683, and slot 686. For example, subject to interaction between attachment mechanism 683 and slot 686, mounting bracket 190 can freely rotate about attachment mechanism 681 when attachment mechanism 683 is in a non-tightened state. In this example, subject to interaction between attachment mechanism 683 and slot 686, mounting bracket 190 can rotate about attachment mechanism 681 in direction 511 or direction 513. By transitioning attachment mechanism 683 from the non-tightened state to a tightened state, rotation of mounting bracket 190 about attachment mechanism 681 can be restricted. In an embodiment, adjustment mechanism 280 can further facilitate detachably coupling mounting bracket 190 to boom arm 170. For example, mounting bracket 190 can become detached from boom arm 170 by removing attachment mechanism 581.

Arm structure 150 can further comprise an adjustment mechanism 180 that intervenes between mounting bracket 190 and a distal end 174 of boom arm 170. Adjustment mechanism 280 can facilitate adjusting an angular orientation 507 of mounting bracket 190 with respect to the boom arm 170 by operation of retention mechanism 583, open slot 584, retention mechanism 585, and attachment mechanism 587. For example, subject to interaction between plate 585 of attachment mechanism 280 and mounting bracket 190, mounting bracket 190 can freely rotate about retention mechanism 583 when retention mechanism 585 is removed and attachment mechanism 587 is in a non-tightened state. By inserting retention mechanism 585 into adjustment mechanism 180 or by transitioning attachment mechanism 587 from the non-tightened state to a tightened state, rotation of mounting bracket 190 about retention mechanism 583 can be restricted. While mounting bracket 190 is freely rotating about retention mechanism 583, retention mechanism 585 can be inserted into adjustment mechanism 180 such that retention mechanism 585 passes through clearance hole 590 of mounting bracket 190 to lock mounting bracket 190 into a corresponding angular orientation 507. In an embodiment, adjustment mechanism 180 can further facilitate detachably coupling mounting bracket 190 to boom arm 170. For example, mounting bracket 190 can become detached from boom arm 170 by removing retention mechanism 583 and transitioning attachment mechanism 587 to the non-tightened state.

Figure 7:
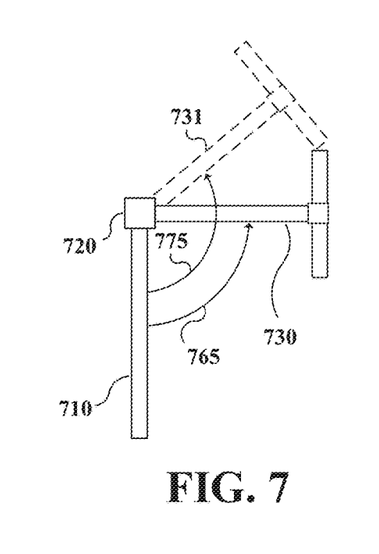
FIG. 7 illustrates an example, non-limiting adjustment mechanism adjusting an angular orientation of a boom arm relative to a mast, in accordance with one or more embodiments described herein.

With reference to FIG. 7, an adjustment mechanism 720 intervening between a boom arm and a mast 710 can facilitate adjusting an angular orientation of the boom arm relative to mast 710. For example, the boom arm can transition from a first position 730 to a second position 731 by operation of adjustment mechanism 720. By transitioning the boom arm from the first position 730 to the second position 731, adjustment mechanism 720 can adjust the angular orientation of the boom arm relative to mast 710 from a first angular orientation 765 to a second angular orientation 775. In an embodiment, adjustment mechanism 720 can be implemented using adjustment mechanism 160. In an embodiment, adjustment mechanism 720 can intervene between the boom arm and a rod (e.g., rod 410) disposed within mast 710.

Figure 8:
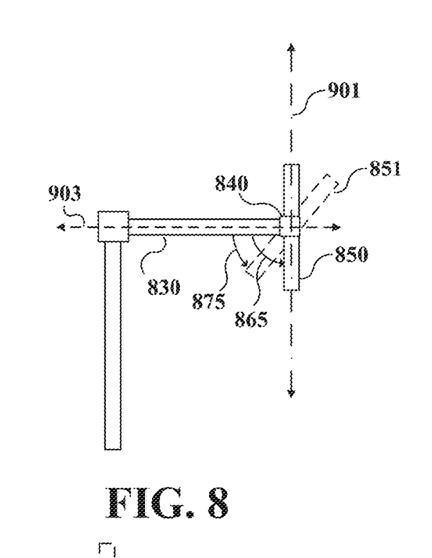
FIG. 8 illustrates an example, non-limiting adjustment mechanism adjusting an angular orientation of a mounting bracket relative to a boom arm, in accordance with one or more embodiments described herein.

With reference to FIG. 8, an adjustment mechanism 840 intervening between a boom arm 830 and a mounting bracket can facilitate adjusting an angular orientation of the mounting bracket relative to boom arm 830. For example, the mounting bracket can transition from a first position 850 to a second position 851 by operation of adjustment mechanism 840. By transitioning the mounting bracket from the first position 850 to the second position 851, adjustment mechanism 840 can adjust the angular orientation of the mounting bracket relative to boom arm 830 from a first angular orientation 865 to a second angular orientation 875. In an embodiment, adjustment mechanism 840 can be implemented using adjustment mechanism 180.

Figure 9:
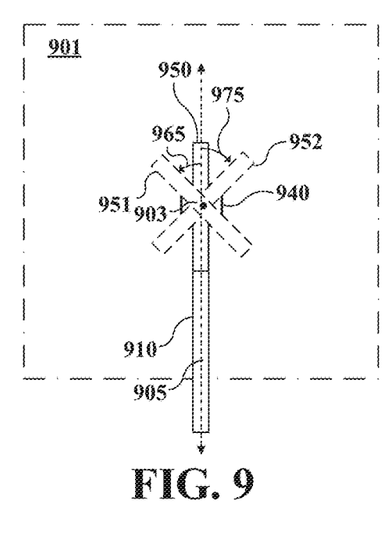
FIG. 9 illustrates an example, non-limiting adjustment mechanism adjusting an angular orientation of a mounting bracket within a transverse plane that is orthogonal to a centerline of a boom arm, in accordance with one or more embodiments described herein.

With reference to FIGS. 8-9, an adjustment mechanism 940 can facilitate adjusting an angular orientation of a mounting bracket within a transverse plane 901 that is orthogonal to a centerline 903 of a boom arm (e.g., boom arm 830). For example, the mounting bracket can transition from a first position 950 to a second position 951 by operation of adjustment mechanism 940. By transitioning the mounting bracket from the first position 950 to the second position 951, adjustment mechanism 940 can adjust the angular orientation of the mounting bracket within transverse plane 901 from an angular orientation in which the mounting bracket is substantially parallel with a centerline 905 of a mast 910 supporting the boom arm to a first angular orientation 965. As another example, the mounting bracket can transition from the first position 950 to a third position 952 by operation of adjustment mechanism 940. By transitioning the mounting bracket from the first position 950 to the third position 952, adjustment mechanism 940 can adjust the angular orientation of the mounting bracket within transverse plane 901 from the angular orientation in which the mounting bracket is substantially parallel with the centerline 905 of mast 910 to a second angular orientation 975. In an embodiment, adjustment mechanism 940 can be implemented using adjustment mechanism 280.

Figure 10:
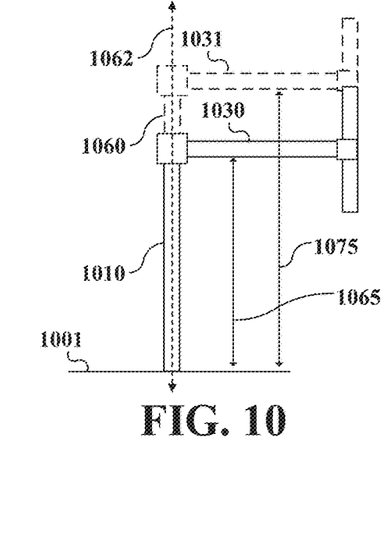
FIG. 10 illustrates an example, non-limiting shaft mechanism adjusting a distance between a base structure and a proximal end of a boom arm, in accordance with one or more embodiments described herein.

With reference to FIG. 10, a shaft mechanism 1060 disposed within a mast 1010 can facilitate adjusting a distance between a base structure 1001 and a boom arm. For example, the boom arm can transition from a first position 1030 to a second position 1031 by adjusting shaft mechanism 1060 along a longitudinal axis 1062. By transitioning the boom arm from the first position 1030 to the second position 1031, shaft mechanism 1060 can adjust a distance between base structure 1001 and the boom arm from a first distance 1065 to a second distance 1075. In an embodiment, mast 1010 and shaft mechanism 1060 can be implemented by mast 140 and shaft mechanism 130, respectively. In an embodiment, mast 1010 can comprise a threaded internal wall that receives threads disposed on an outer wall of shaft mechanism 1060. In an embodiment, shaft mechanism 1060 can comprise a threaded outer wall that receives threads disposed on an inner wall of mast 1010. In an embodiment, rotation of shaft mechanism 1060 about the longitudinal axis 1062 in a first direction can increase a distance between base structure 1001 and the boom arm while rotation of shaft mechanism 1060 about the longitudinal axis 1062 in a second direction that opposes the first direction can decrease a distance between base structure 1001 and the boom arm.

Figure 11:
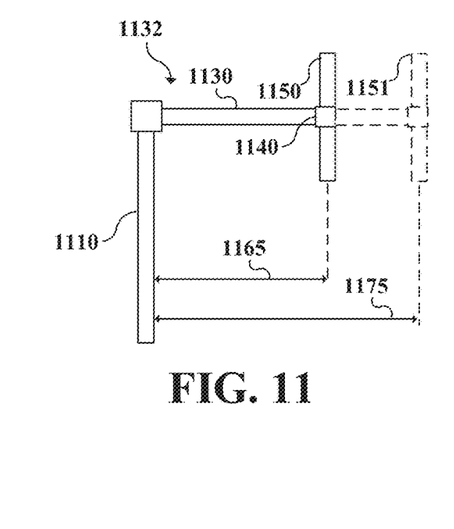
FIG. 11 illustrates an example, non-limiting adjustment mechanism adjusting a distance between a mast and a mounting bracket, in accordance with one or more embodiments described herein.

With reference to FIG. 11, an adjustment mechanism (e.g., adjustment mechanisms 1120 and/or 1140) intervening between a mast 1110 and a mounting bracket can facilitate adjusting a distance between the mounting bracket and mast 1110. For example, the mounting bracket can transition from a first position 1150 to a second position 1151 by operation of the adjustment mechanism. By transitioning the mounting bracket from the first position 1150 to the second position 1151, the adjustment mechanism can adjust the distance between the mounting bracket and mast 1110 from a first distance 1165 to a second distance 1175. In an embodiment, the adjustment mechanism can be implemented using adjustment mechanism 280.

Figure 12:
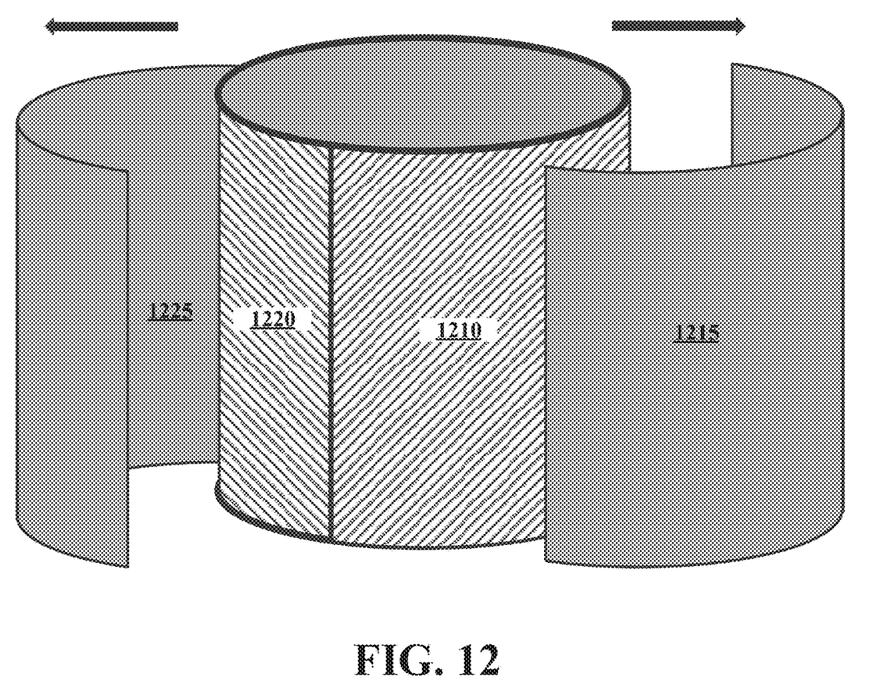
FIG. 12 illustrates an example, non-limiting high-level conceptual overview of transferring loads by rotation of boom arms, in accordance with one or more embodiments described herein

FIG. 12 illustrates an example, non-limiting high-level conceptual overview of transferring loads by rotation of boom arms, in accordance with one or more embodiments described herein. By way of example, the loads of FIG. 12 can be implemented as the sectioned sidewalls (i.e., loads 103 and 104) of the cylindrical chamber illustrated in FIGS. 1-3. In this example, a boom arm of jib crane 101 can be coupled to load 103 in position 1210 and a boom arm of jib crane 102 can be coupled to load 104 in position 1220. By rotating the boom arm of jib crane 101 about its respective longitudinal axis, load 103 can be transferred from position 1210 to position 1215. Similarly, by rotating the boom arm of jib crane 102 about its respective longitudinal axis, load 104 can be transferred from position 1220 to position 1225.

Figure 13:
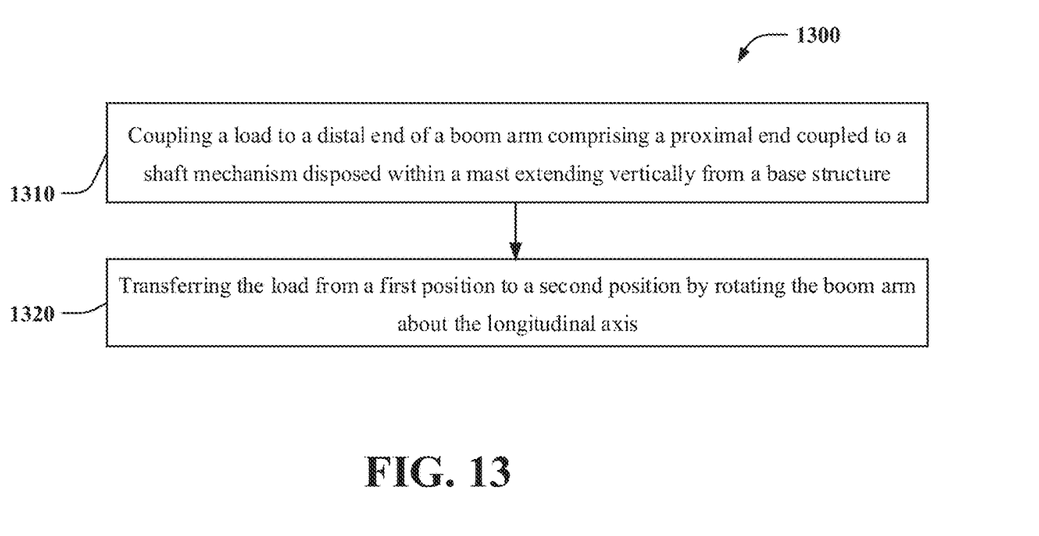
FIG. 13 illustrates a flow diagram of an example, non-limiting computer-implemented method of facilitating operation of a jib crane to transfer loads, in accordance with one or more embodiments described herein.

FIG. 13 illustrates a flow diagram of an example, non-limiting computer-implemented method 1300 of facilitating increased operational reliability for jib cranes, in accordance with one or more embodiments described herein. Repetitive description of like elements employed in other embodiments described herein is omitted for sake of brevity. At 1310, the computer-implemented method 1300 can comprise coupling, by a system operatively coupled to a processor, a load to a distal end of a boom arm (e.g., boom arm 170) comprising a proximal end coupled to a shaft mechanism (e.g., shaft mechanism 140) disposed within a mast (e.g., mast 130) extending vertically from a base structure (e.g., base structure 110). The boom arm can be continuously rotatable about a longitudinal axis of the shaft mechanism with respect to the base structure. At 1320, the computer-implemented method 1300 can further comprise transferring, by the system, the load from a first position to a second position by rotating the boom arm about the longitudinal axis. In an embodiment, the system can rotate the boom arm about the longitudinal axis by activating a controller associated with a driving mechanism coupled to a rod (e.g., rod 410) disposed within the shaft mechanism. In an embodiment, the driving mechanism can comprise a motor or an engine. In an embodiment, the computer-implemented method 1300 can further comprise adjusting, by the system, an angular orientation of the boom arm relative to the mast, an angular orientation of a mounting bracket within a transverse plane that is orthogonal to a centerline of the boom arm, a distance between the mounting bracket and the mast, or an angular orientation of the mounting bracket with respect to the boom arm. In an embodiment, the mounting bracket can be coupled to the distal end of the boom arm.

Figure 14:
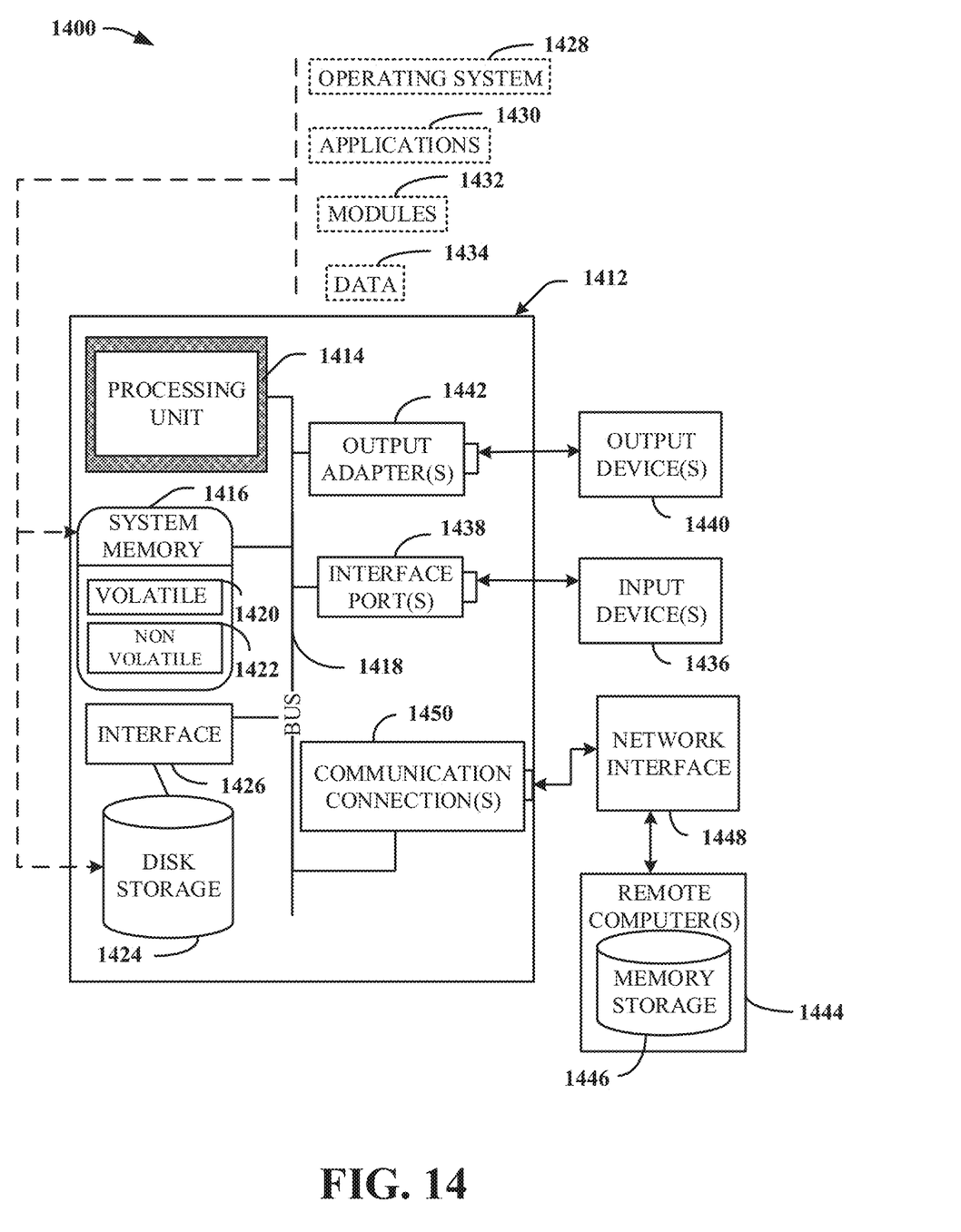
FIG. 14 illustrates a block diagram of an example, non-limiting operating environment in which one or more embodiments described herein can be facilitated.

In order to provide a context for the various aspects of the disclosed subject matter, FIG. 14 as well as the following discussion are intended to provide a general description of a suitable environment in which the various aspects of the disclosed subject matter can be implemented. FIG. 14 illustrates a suitable operating environment 1400 for implementing various aspects of this disclosure can also include a computer 1412. The computer 1412 can also include a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414. The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1416 can also include volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1420 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1412 can also include removable/non-removable, volatile/non-volatile computer storage media. FIG. 14 illustrates, for example, a disk storage 1424. Disk storage 1424 can also include, but is not limited to, devices like a magnetic disk drive, floppy disk drive, tape drive, Jaz drive, Zip drive, LS-100 drive, flash memory card, or memory stick. The disk storage 1424 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1424 to the system bus 1418, a removable or non-removable interface is typically used, such as interface 1426. FIG. 14 also depicts software that acts as an intermediary between users and the basic computer resources described in the suitable operating environment 1400. Such software can also include, for example, an operating system 1428. Operating system 1428, which can be stored on disk storage 1424, acts to control and allocate resources of the computer 1412. System applications 1430 take advantage of the management of resources by operating system 1428 through program modules 1432 and program data 1434, e.g., stored either in system memory 1416 or on disk storage 1424. It is to be appreciated that this disclosure can be implemented with various operating systems or combinations of operating systems. A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port can be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It can be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a computer, a server, a router, a network PC, a workstation, a microprocessor-based appliance, a peer device or other common network node and the like, and typically can also include many or the elements described relative to computer 1412. For purposes of brevity, only a memory storage device 1446 is illustrated with remote computer(s) 1444. Remote computer(s) 1444 is logically connected to computer 1412 through a network interface 1148 and then physically connected via communication connection 1450. Network interface 1448 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1450 refers to the hardware/software employed to connect the network interface 1448 to the system bus 1418. While communication connection 1450 is shown for illustrative clarity inside computer 1412, it can also be external to computer 1412. The hardware/software for connection to the network interface 1448 can also include, for exemplary purposes only, internal and external technologies such as, modems including regular telephone grade modems, cable modems and DSL modems, ISDN adapters, and Ethernet cards.

The present invention may be a system, an apparatus, a computer-implemented method, and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A jib crane, comprising:
a mast extending vertically from a base structure;
a shaft mechanism disposed within the mast;
a rod that is coupled to a boom arm and is disposed within the shaft mechanism, wherein rotation of the rod facilitates continuous rotation of the boom arm about a longitudinal axis of the rod with respect to the base structure;
a mounting bracket that facilitates coupling a load to a distal end of the boom arm that opposes a proximal end of the boom arm coupled to the rod, wherein the mounting bracket comprises a plurality of pick points that facilitate coupling the load to the distal end of the boom
an adjustment mechanism intervening between the boom arm and the mounting bracket that facilitates adjusting a distance between the mounting bracket and the mast.

2. The jib crane of claim 1, further comprising:
a bushing intervening between the shaft mechanism and the mast proximate to the base structure or proximate to the boom arm.

3. The jib crane of claim 1, further comprising: an adjustment mechanism intervening between the boom arm and the rod that facilitates adjusting an angular orientation of the boom arm relative to the mast.

4. The jib crane of claim 3, wherein the boom arm is detachably coupled to the rod via the adjustment mechanism.

5. The jib crane of claim 1, wherein the base structure is anchored to a surface via a plurality of attachment mechanisms.

6. The jib crane of claim 1, an adjustment mechanism intervening between the boom arm and the mounting bracket that facilitates adjusting a distance between the mounting bracket and the mast.

7. An apparatus, comprising:
a boom arm coupled to a rod disposed within a shaft mechanism that is disposed within a mast extending vertically from a base structure, wherein rotation of the rod facilitates continuous rotation of the boom arm about a longitudinal axis of the rod with respect to the base structure,
wherein the boom arm comprises a proximal end coupled to the rod; and
a mounting bracket that facilitates coupling a load to a distal end of the boom arm that opposes the proximal end, wherein the mounting bracket comprises a plurality of pick points that facilitate coupling the load to the distal end of the boom arm.

8. The apparatus of claim 7, wherein the plurality of pick points includes first and second pick points that are disposed proximate to opposing ends of the mounting bracket.

9. The apparatus of claim 7, wherein the apparatus further comprises:
an adjustment mechanism intervening between the boom arm and the mounting bracket coupled to the distal end of the boom arm that opposes the proximal end, wherein the adjustment mechanism facilitates adjusting an angular orientation of the mounting bracket within a transverse plane that is orthogonal to a centerline of the boom arm.

10. The apparatus of claim 9, wherein the adjustment mechanism further facilitates adjusting a distance between the mounting bracket and the mast.

11. The apparatus of claim 9, wherein the boom arm is detachably coupled to the mounting bracket via the adjustment mechanism.

12. The apparatus of claim 7, wherein the apparatus further comprises:
an adjustment mechanism intervening between the boom arm and the mounting bracket coupled to the distal end of the boom arm that opposes the proximal end, wherein the adjustment mechanism facilitates adjusting a distance between the mounting bracket and the mast.

13. The apparatus of claim 7, wherein the apparatus further comprises:
an adjustment mechanism intervening between the boom arm and the mounting bracket coupled to the distal end of the boom arm that opposes the proximal end, wherein the adjustment mechanism facilitates adjusting an angular orientation of the mounting bracket with respect to the boom arm.

14. An apparatus, comprising:
a shaft mechanism disposed within a mast extending vertically from a base structure,
wherein the shaft mechanism supports a boom arm; and
a rod disposed within the shaft mechanism, wherein rotation of the rod facilitates continuous rotation of the boom arm about a longitudinal axis of the rod with respect to the base structure, wherein the boom arm comprises a proximal end coupled to the shaft mechanism; and
a mounting bracket that facilitates coupling a load to a distal end of the boom arm that opposes the proximal end, wherein the mounting bracket comprises a plurality of pick points that facilitate coupling the load to the distal end of the boom arm.

15. The apparatus of claim 14, wherein the shaft mechanism comprises a cylinder of stainless steel.

16. The apparatus of claim 14, further comprising:
a bushing intervening between the shaft mechanism and the mast proximate to the base structure, proximate to the boom arm, or a combination thereof.

17. The apparatus of claim 16, wherein the bushing contacts an internal wall of the mast and an outer wall of the shaft mechanism.

18. The apparatus of claim 14, wherein the shaft mechanism is adjustable along the longitudinal axis to facilitate adjusting a distance between the base structure and the proximal end of the boom arm that is coupled to the shaft mechanism.

19. The apparatus of claim 14, wherein the base structure is anchored to a frame supporting a load, a surface supporting the frame, or a combination thereof.

20. An apparatus, comprising:
a rod disposed within a mast extending from a base structure;
a boom arm coupled to the rod via a proximal end of the boom arm, wherein the boom arm is continuously rotatable about a longitudinal axis of the rod with respect to the base structure;
a mounting bracket that facilitates coupling a load to a distal end of the boom arm that opposes the proximal end of the boom arm coupled to the rod; and
one or more adjustment mechanisms that facilitate adjusting an angular orientation of the mounting bracket with respect to the boom arm.

21. The apparatus of claim 20, where the one or more adjustment mechanisms further facilitate adjusting at least one of: an angular orientation of the boom arm relative to the mast; an angular orientation of the mounting bracket within a transverse plane that is orthogonal to a centerline of the boom arm; or a distance between the mounting bracket and the mast.

22. Apparatus of claim 20, wherein the mounting bracket comprises a plurality of pick points that facilitate coupling the load to the distal end of the boom arm.

23. A computer-implemented method comprising:
coupling, by a system operatively coupled to a processor, via a mounting bracket coupled to a distal end of a boom arm, a load to the distal end of the boom arm comprising a proximal end coupled to a rod disposed within a shaft mechanism disposed within a mast extending vertically from a base structure, wherein the boom arm is continuously rotatable about a longitudinal axis of the rod with respect to the base structure;
transferring, by the system, the load from a first position to a second position by rotating the boom arm about the longitudinal axis; and
adjusting, by the system, via one or more adjustment mechanisms, an angular orientation of the mounting bracket with respect to the boom arm.

24. The method of claim 23, further comprising:
adjusting, by the system, via the one or more adjustment mechanisms, at least one of: an angular orientation of the boom arm relative to the mast, an angular orientation of a mounting bracket within a transverse plane that is orthogonal to a centerline of the boom arm, a distance between the mounting bracket and the mast, or.

25. The computer-implemented method of claim 23, wherein the mounting bracket comprises a plurality of pick points that facilitate coupling the load to the distal end of the boom arm.

* * * * *